United States Patent
Chilcott et al.

(10) Patent No.: US 11,697,501 B2
(45) Date of Patent: Jul. 11, 2023

(54) PASSENGER SEATING ARRANGEMENT

(71) Applicant: RECARO Aircraft Seating GmbH & Co. KG, Schwäbisch Hall (DE)

(72) Inventors: Christopher Chilcott, Argyle, TX (US); Hermann Hoffmann, Schwäbisch Hall (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 142 days.

(21) Appl. No.: 17/133,706

(22) Filed: Dec. 24, 2020

(65) Prior Publication Data
US 2022/0204165 A1    Jun. 30, 2022

(51) Int. Cl.
*B64D 11/06* (2006.01)

(52) U.S. Cl.
CPC ...... *B64D 11/0601* (2014.12); *B64D 11/0605* (2014.12); *B64D 11/0606* (2014.12); *B64D 11/0636* (2014.12); *B64D 11/0638* (2014.12); *B64D 11/0641* (2014.12)

(58) Field of Classification Search
CPC . B64D 11/601; B64D 11/605; B64D 11/0641; B64D 11/0606
See application file for complete search history.

(56) References Cited

U.S. PATENT DOCUMENTS

| | | | |
|---|---|---|---|
| 2010/0038484 A1* | 2/2010 | Ersan | B64D 11/06 244/118.6 |
| 2021/0276716 A1* | 9/2021 | Nicholas | B64D 11/0606 |
| 2022/0055754 A1* | 2/2022 | Dowty | B64D 11/0601 |

* cited by examiner

*Primary Examiner* — Brady W Frazier
*Assistant Examiner* — Shanna Danielle Glover
(74) *Attorney, Agent, or Firm* — Posz Law Group, PLC (57) ABSTRACT

In a passenger seating arrangement in an aircraft cabin, the passenger seating arrangement has exactly two rows of seat units and exactly one aisle. A first row of seat units and a second row of seat units are separated by the aisle. The rows of seat units and the aisle all extend in a longitudinal direction parallel to a longitudinal axis of the aircraft cabin. Each seat unit includes a seat, an upper shell and a lower shell, the lower shell forming a footwell. The seats are arranged in parallel to each other in a seating direction. An upper shell of a first seat unit and a lower shell of a second seat unit, which, viewed in the longitudinal direction, is arranged behind the first seat unit, partially overlap in a vertical direction.

15 Claims, 3 Drawing Sheets

PASSENGER SEATING ARRANGEMENT

PRIOR ART

The invention relates to a passenger seating arrangement according to claim 1.

From prior art a variety of passenger seating arrangements in aircraft cabins are known, while a challenge is to use limited space inside the aircraft cabin optimally, in order to provide maximum convenience for passengers, in particular in business and first-class compartments. Recent developments in aircraft seating tend to so called single aisle layouts for business and first-class compartments. Known passenger seating arrangements with single aisle layouts comprise a first row and a second row of seat units, wherein the first and second rows are separated by an aisle and wherein the rows of seat units and the aisle all extend in a longitudinal direction parallel to a longitudinal axis of an aircraft cabin.

An objective of this invention is, in particular, to provide a passenger seating arrangement with improved characteristics regarding a convenience for passengers. The objective is achieved, according to the invention, by the features of claim 1, while advantageous implementations and further developments of the invention may be gathered from the dependent claims.

ADVANTAGES OF THE INVENTION

A passenger seating arrangement in an aircraft cabin is proposed, the passenger seating arrangement comprising exactly two rows of seat units and exactly one aisle, wherein a first row of seat units and a second row of seat units are separated by the aisle, and wherein the rows of seat units and the aisle all extend in a longitudinal direction parallel to a longitudinal axis of the aircraft cabin, each seat unit comprising a seat, an upper shell and a lower shell, the lower shell forming a footwell, wherein the seats are arranged in parallel to each other in a seating direction, wherein an upper shell of a first seat unit and a lower shell of a second seat unit, which, viewed in the longitudinal direction, is arranged behind the first seat unit, partially overlap in a vertical direction.

By means of the invention advantageously a passenger seating arrangement with improved characteristics regarding a convenience for passengers can be provided. In particular a passenger seating arrangement with enhanced space, in particular enhanced seating space and/or enhanced lying-down surface, for passengers can be provided. Furthermore, advantageously a space in an aircraft cabin can be utilized optimally. Thus, a maximum amount of seat units can be arranged within the aircraft cabin, while at the same time a maximum convenience for passengers in each seat unit can be provided.

Due to its optimized space utilization the passengers seating arrangements may in particular be suitable for small and medium size aircrafts.

By a "row of seat units" herein should be understood, in particular, a multiplicity of at least two seat units, which are sequentially arranged along the longitudinal direction. In this case "a longitudinal direction" should be understood to mean, in particular, a main direction of extension of the aircraft cabin extending from a tail region of the aircraft cabin to a front region of the aircraft cabin, which is arranged next to a cockpit of the aircraft, in parallel to the longitudinal axis of the aircraft cabin.

By a "seat unit" herein should be understood, in particular, a unit of the passenger seating arrangement, which comprises at least a seat, an upper shell and a lower shell and preferably a rear shell, and which in an assembled state of the passenger seating arrangement forms a passenger compartment for at least one, advantageously exactly one, passenger. Preferably the seat unit comprises a seat module and a furniture module. The seat module comprises the seat. The furniture module preferably comprises the upper shell, the lower shell and the rear shell. The furniture module may in particular forms and/or comprises furniture elements, such as shelfs and/or stowages and/or tables and/or desk and/or the like. In order to provide a maximum privacy for passengers, preferably each upper shell of each seat unit has a height of at least 48 inches, which roughly corresponds to 1,22 meters in metric units. Moreover, each seat unit advantageously comprises a slide-door to close off the seat unit at least partially towards the aisle. The slide-door preferentially has at least substantially the same height as the upper shell. In a closed state the slide-door partitions off a passenger compartment of the seat unit towards the aisle. Preferably each seat unit comprises a drawer, which is arranged below the footwell of the respective seat unit. Furthermore, each seat unit preferably comprises an entertainment unit with at least one monitor for work and/or entertainment purposes. Moreover, each seat unit preferably comprises at least one power port, preferentially a multiplicity of power ports. Each seat unit may in particular comprise a plurality of storage elements, e.g. a pocket to store magazines or personal items of a passenger. The pocket may advantageously be backlit, e.g. by means of LEDs or the like.

The "lower shell" is in particular to be understood as an element of the seat unit, which faces towards the cabin floor. From the cabin floor of the aircraft cabin the lower shell has an extension of at least 20 inches in a vertical direction at least substantially perpendicular to the cabin floor. The "upper shell" is in particular to be understood as an element of the seat unit, which aligns with the lower shell in the vertical direction at least substantially perpendicular to the cabin floor of the aircraft cabin and in particular faces towards a ceiling of the aircraft cabin. The lower shell forms a lower border of the footwell, which has a main extension at least substantially parallel to the cabin floor of the aircraft cabin, a frontside border of the footwell, which has a main extension at least substantially perpendicular to the seating direction, and two lateral borders of the footwell, which each have main extensions at least substantially parallel to the seating direction. The upper shell forms an upper border of the footwell, which has a main extension at least substantially parallel to the cabin floor. In an assembled state of the seat unit inside the aircraft cabin, the upper shell and the lower shell form a housing of the seat unit. By an "assembled state" should be herein understood, in particular, a state in which the seat units are fixedly connected, preferably installed in the aircraft cabin. The upper shell and the lower shell may be formed separately from each other and may be connected to each other, for instance by a form-fit and/or a force-fit connection. However, it is also conceivable, that the upper shell and the lower shell are implemented integrally. In case the upper shell and the lower shell are implemented integrally, the upper shell is to be understood as the part which extends from the top end of the footwell in the vertical direction at least substantially perpendicular to the cabin floor. In this context "implemented integrally" is in particular to mean connected at least by substance-to-substance bond, e.g. by a welding process, an adhesive bonding, an injection-molding process, preferably a thermo-forming process, and/or by another process that is deemed expedient by a person having ordinary skill in the art. In particular, "implemented integrally" could in particular mean made of one piece. "Made of one piece" is, in particular, to mean, in this context, manufactured from one single piece, e.g. by production from one single cast, and/or by manufacturing in a one-component or multi-component injection-molding process, and for example from a single blank. The lower shell forms the footwell. The footwell preferably comprises an ottoman. The footwell preferably has a width of at least 26 inches, in a direction at least substantially perpendicular to the seating direction.

By a "seat" herein should be understood, in particular, a business class aircraft seat or a first-class aircraft seat, which is mounted in the aircraft cabin and which is provided to serve as a seating and/or lying accommodation for a passenger in the aircraft cabin. In principle, it is also conceivable, however, that the seat is configured as an economy class aircraft seat. The seat comprises a backrest and a seat bottom. The seat has a seating configuration and a lying configuration. In the seating configuration of the seat the backrest has an at least substantially vertical position and is oriented at least substantially perpendicular to the cabin floor of the aircraft cabin and the seat bottom has an at least substantially horizontal position and is oriented at least substantially parallel to the cabin floor of the aircraft cabin. In the lying configuration of the seat the backrest and the seat bottom each have an at least substantially horizontal position and are oriented at least substantially parallel to the cabin floor. In the lying configuration the backrest and the seat bottom preferably form a substantially planar lying-down surface. The backrest and the seat bottom of the seat preferably having a width of at least 21 inches, in a direction at least substantially perpendicular to the seating direction. In this context, a "seating direction" should be understood to mean a direction which is defined by an axis starting perpendicularly from a main support surface of a backrest of seat, with the backrest standing at least substantially perpendicular to a cabin floor of the aircraft cabin.

The surfaces of the components of each of the seat units, in particular the surfaces of the seats, the upper shell and the lower shell, may include hygienic materials in order to provide a maximum safety for passengers. Hygienic materials may include, but not be limited to, easy to clean plastic surfaces, antimicrobial leather and/or fabric, dress covers, which can be exchanged easily, and the like.

The upper shell and/or the lower shell and/or the seat and/or other elements of each seat unit may comprise a plurality of different materials, such as wood, plastics, metals and/or metal alloys, fabrics and the like. Furthermore, some surfaces of some of the elements of the seat units may be painted or coated.

The phrase "partially overlap" should herein be understood to mean, in particular, that at least one region of the upper shell of the first seat unit and at least one region of the lower shell of the second seat unit are arranged in an overlap in a vertical direction. The vertical direction is orthogonal to the cabin floor of the aircraft cabin. The vertical direction is, in particular, at least substantially perpendicular to the longitudinal direction. The phrase stating that a straight line and/or plane is oriented "at least substantially parallel" to a further straight line and/or plane formed separately from the first straight line and/or plane is intended, in particular, to mean that the straight line and/or plane encloses an angle with the further straight line and/or plane which deviates by less than 10°, preferably by less than 5°, and, in particular, by less than 2° from an angle of 0°. The phrase stating that a straight line and/or a plane is oriented "at least substantially perpendicular" to a further straight line and/or plane formed separately from the first straight line and/or plane is intended, in particular, to mean that the straight line and/or plane encloses an angle with the further straight line and/or plane which deviates by less than 15°, preferably by less than 10°, and, in particular, by less than 5° from an angle of 90°.

Furthermore, in the following description the terms "in front of", "at the front", "at the rear", "rearward", "front side", "forward side", "rear side", etc., relate to the longitudinal direction of the aircraft cabin. In addition, the terms "at the top", "at the bottom", "above", "below", etc., relate to a vertical direction disposed perpendicularly to a cabin floor of the aircraft cabin and starting therefrom.

In this patent application numerals preceding certain terms, such as "first" and "second" etc., are solely intended for distinction between different objects and/or to illustrate a relation between different objects and do neither imply a total number of existing objects nor a hierarchy between those objects. In particular, a "second object" does not necessarily imply the existence of a "first object".

In this context, "configured" is in particular to mean specifically designed and/or equipped. By an object being configured for a certain function is in particular to be understood that the object implements and/or fulfills said certain function in at least one application state and/or operative state.

Furthermore, it is proposed that viewed in a transverse direction perpendicularly to the longitudinal axis, a footwell of the first seat unit partially overlaps with a footwell of the second seat unit. On account of this advantageously a diameter of each footwell can be enhanced. Thus, a space for passengers can be enhanced and a comfort for passengers can be further advanced. The transverse direction extends at least substantially parallel to the cabin floor of the aircraft cabin in a direction at least substantially perpendicular to the longitudinal direction. Preferably the footwell of the first seat unit and the footwell of the second seat unit each have a width of at least 26 inches, in a direction at least substantially perpendicular to the seating direction.

Moreover, it is proposed that the first seat unit comprises an upper stowage, which is partially arranged above the lower shell of the second seat unit. As a result of this a storage space for passengers can be enhanced. Preferably every seat unit comprises an upper stowage which is partially arranged above a lower shelf of a seat unit, which is, in viewing direction along the longitudinal axis of the aircraft cabin, arranged behind the respective seat unit. The upper stowage may face towards a passenger, who is sitting in the seat behind in the seating direction. Preferably, however, the upper stowage comprises a bend, which in an assembled state of the first seat unit extends along a vertical direction, such that a first section of the upper stowage is oriented in the longitudinal direction and a second section of the upper stowage is oriented in the seating direction. Hereby a storage space provided by the upper stowage can advantageously further be enhanced. The upper stowage may provide a single contiguous storage space. It is also conceivable, however, that the upper stowage space may be divided in two or more compartments. In this case it would be conceivable that a first compartment of the upper stowage is designated for a passenger in the first seat unit and a second stowage is designated for a passenger in the second seat unit.

It is further proposed, that the upper shell of the first seat unit and the lower shell of the second seat unit overlap over an area of at least 3 square inches. On account of this seating spaces in the first and second seating unit can be optimized, thus a convenience for passengers can be further enhanced. The area of at least 3 square inches, over which the upper shell of the first seat unit and the lower shell overlap, roughly corresponds to at least 0.0019 square meters in metric units. Preferably the upper shell of the first seat unit and the lower shell of the second seat unit overlap over an area of at least 3.5 square inches, preferentially over an area of at least 4 square inches.

In an advantageous implementation of the invention, it is proposed that each seat of each seat unit is arranged such that the seating direction includes a maximum seating angle of 45° with the longitudinal axis. In this way advantageously a space inside the aircraft cabin can be utilized optimally. Hence, advantageously a passenger seating arrangement with improved characteristics regarding a space for each passenger can be provided. By a "seating angle" in this context should be understood, in particular, an angle between an axis starting perpendicularly from a main support surface of a backrest of the seat and the longitudinal axis of the aircraft cabin. Preferably each seat of each seat unit is arranged such that the seating direction includes a maximum seating angle between 45° and 35° with the longitudinal axis.

The seats of each of the seat units or at least some seats of some of the seat units could be arranged such that the seating direction is facing towards the aisle. In an advantageous embodiment of the present invention, however, it is proposed that each seat of each seat unit is arranged such that the seating direction is facing away from the aisle. On account of this advantageously a privacy for passengers can be improved.

Furthermore, it is proposed that each seat unit provides a shoulder space having a width of at least 28 inches. On account of this, advantageously a seating space for passengers can be enhanced. Thus, a convenience for passengers can be further improved. The width of at least 28 inches roughly corresponds to at least 0.71 meters in metric units. A "shoulder space" is to be understood as a space, which has a main extension that is at least substantially extending in parallel to the backrest of a seat. The main extension of the shoulder space may correspond at least to a width of the backrest of the seat.

Preferentially the main extension of the shoulder space exceeds the width of the backrest by at least 10%.

Moreover, it is proposed that each seat has a seating configuration and a flat-bed configuration, and wherein in the flat-bed configuration the seat unit provides a lying-down surface with a length of at least 80 inches. As a result of this advantageously a convenience for passengers can be further improved. In particular in the flat-bed configuration a lying-down surface can be provided, which is also suitable for tall people. The length of at least 80 inches of the lying-down surface roughly corresponds to at least 2.0 meters in metric units. By a "seating configuration" should herein be understood, in particular, a substantially vertical position of the backrest of the seat, in which the backrest is oriented at least substantially perpendicular to a support plane on which the seat is mounted and a substantially horizontal position of a seat bottom of the seat, in which the seat bottom is oriented at least substantially parallel to a support plane on which the seat is mounted. By a "flat-bed configuration" should herein be understood, in particular, a substantially horizontal position of the seat, in which both the seat bottom and the backrest of the seat are oriented at least substantially parallel to a support plane on which the seat is mounted. The seat unit may have a variety of configurations in-between the seating configuration and the flat-bed configuration. For example, it is conceivable that the backrest may be engaged in different positions in-between a substantially vertical and a substantially horizontal position. Preferably each seat unit in the flat-bed configuration provides a lying-down surface with a length of at least 84 inches.

Beyond that it is proposed that the first seat unit comprises a shelf space that is arranged above a footwell of the second seat unit. On account of this a convenience for passengers can be further enhanced. Preferably the shelf space is configured to provide a stationary desk for passengers. In particular every seat unit comprises a shelf space that is arranged above a footwell of a directly neighboring seat unit, that is arranged behind the respective seat unit viewed along the longitudinal direction of the aircraft cabin.

On top of this, it is proposed that the shelf space has a maximum extension of at least 30 inches in a direction that is perpendicular to the longitudinal direction and an extension of at least 19 inches in the longitudinal direction. On account of this, a comfort for passengers can be further enhanced. In particular, a shelf space with improved dimensions, that are especially designed for working, can be provided. The maximum extension of at least 30 inches roughly corresponds to at least 0.76 meters in metric units and the extension of at least 19 inches roughly corresponds to at least 0.48 meters in metric units respectively.

In a further advantageous implementation of the invention it is proposed that each seat unit comprises a table having a width of at least 24 inches and a depth of at least 22 inches. As a result of this advantageously a convenience for passengers can be further improved. In particular, a table with optimum dimensions for passengers to enjoy meals can be provided. The table could be fixed to the lower shell of the respective seat unit. Preferably, however, the table is being embodied as a tray table. The table for example may be hinged to the lower shell of the respective seat unit. Preferably, the table is slidable and can be stored inside a storage space above the footwell, when not in use.

Preferably the table in a folded-out position ends flush with shelf space that is arranged above the lower shell of the second seat unit. The table and the shelf space in combination provide an area with an overall extension of 50 inches. On account of this, advantageously a multifaceted area, that serves as a big workspace or as a premier dining table can be provided. The width of at least 24 inches roughly corresponds to at least 0.60 meters and the depth of at least 22 inches roughly corresponds to at least 0.55 meters in metric units respectively.

It is further proposed that each seat unit has an extension of at least 37 inches in the longitudinal direction. On account of this, advantageously a space for passengers can be optimized. Furthermore, a space of the aircraft cabin is used optimally. The extension of the seat unit in the longitudinal direction of at least 37 inches roughly corresponds to at least 0.93 meters in metric units. The extension of the seat unit in longitudinal direction may in particular be provided to provide access for passengers to the seat unit from the aisle. Preferably, each seat unit has an egress, the egress having a width of at least 14 inches in a direction at least substantially parallel to the longitudinal direction.

Preferentially, the egress has a width of at least 16 inches in the direction at least substantially parallel to the longitudinal direction. The slide-doors of each of the seat units may in particular be arranged along the extension of the seat unit in the longitudinal direction and be configured to close the egress towards the aisle. As a result of this a passenger using the seat unit on a seat unit can reach the aisle at any time in a simple and comfortable manner independently of a seated neighbor of the passenger.

Herein the passenger seating arrangement is not to be limited to the application and implementation described above. In particular, for the purpose of fulfilling a functionality herein described, the passenger seating arrangement may comprise a number of respective elements, structural components and units that differs from the number mentioned herein. Furthermore, regarding the value ranges mentioned in this disclosure, values within the limits mentioned are to be understood to be also disclosed and to be used as applicable.

BRIEF DESCRIPTION OF THE DRAWINGS

Further advantages may become apparent from the following description of the drawings. In the drawing an exemplary embodiment of the invention is shown. The drawing, the description and the claims contain a plurality of features in combination. Someone having ordinary skill in the art will purposefully also consider the features separately and will find further expedient combinations. If there is more than one specimen of a certain object, only one of these is given a reference numeral in the figures and in the description. The description of this specimen may be correspondingly transferred to the other specimens of the object.

DETAILED DESCRIPTION OF THE INVENTION

Figure 1:
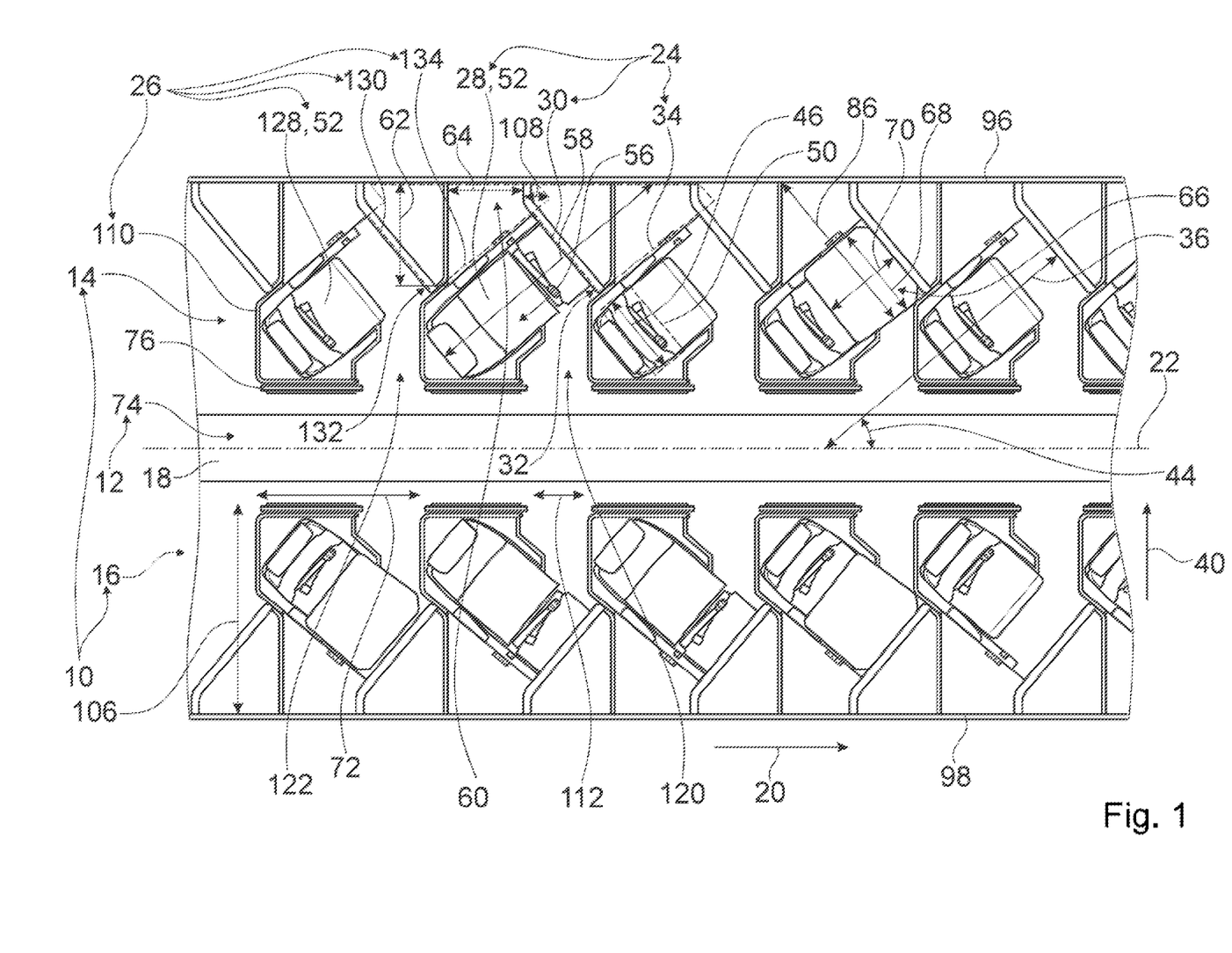
FIG. 1 A passenger seating arrangement in an aircraft cabin comprising a first row of seat units and a second row of seat units in a schematic top view, FIG. 2 a first seat unit of the passenger seating arrangement in a schematic perspective view and FIG. 3 the first seat unit of the passenger seating arrangement in a schematic perspective view.

FIG. 1 shows a passenger seating arrangement 10 in an aircraft cabin 12. The aircraft cabin 12 is part of an aircraft (not shown). The aircraft cabin 12 is configured to accommodate passengers of the aircraft. The passenger seating arrangement 10 comprises exactly two rows 14, 16 of seat units 24, 26 and exactly one aisle 18. The aircraft cabin 12 may in particular be designed to be arranged inside of a small aircraft (not shown), since small aircrafts recently become more popular. It is also conceivable that the passenger seating arrangement 10 makes up just a part of the aircraft cabin 12 and other seating arrangements (not shown) are arranged in the aircraft cabin 12 as well.

A first row 14 of seat units 24, 26 and a second row 16 of seating units 24, 26 are separated by the aisle 18. The aircraft cabin 12 has a longitudinal axis 22. The longitudinal axis 22 is embodied as central axis of the aircraft cabin 12. The longitudinal axis 22 has the same distance towards two opposite exterior walls 96, 98 of the aircraft cabin 12. The longitudinal axis 22 is parallel to a cabin floor 74 of the aircraft cabin 12. The first row 14 of seat units 24, 26, the second row 16 of seat units 24, 26 and the aisle 18 all extend in a longitudinal direction 20 parallel to the longitudinal axis 22 of the aircraft cabin 12.

In each of the rows 14, 16 the seat units 24, 26 are arranged sequentially along the longitudinal direction 20. Viewed in the longitudinal direction 20 a first seat unit 24 is arranged in front of a second seat unit 26. In the longitudinal direction 20 the second seat unit 26 is arranged immediately adjacent to the first seat unit 24.

In the present embodiment the first seat unit 24 and the second seat unit 26 are at least substantially structurally identical to each other. However, it would be also conceivable that the first seat unit 24 and the second seat unit 26 can have at least partly different structures.

Figure 3:
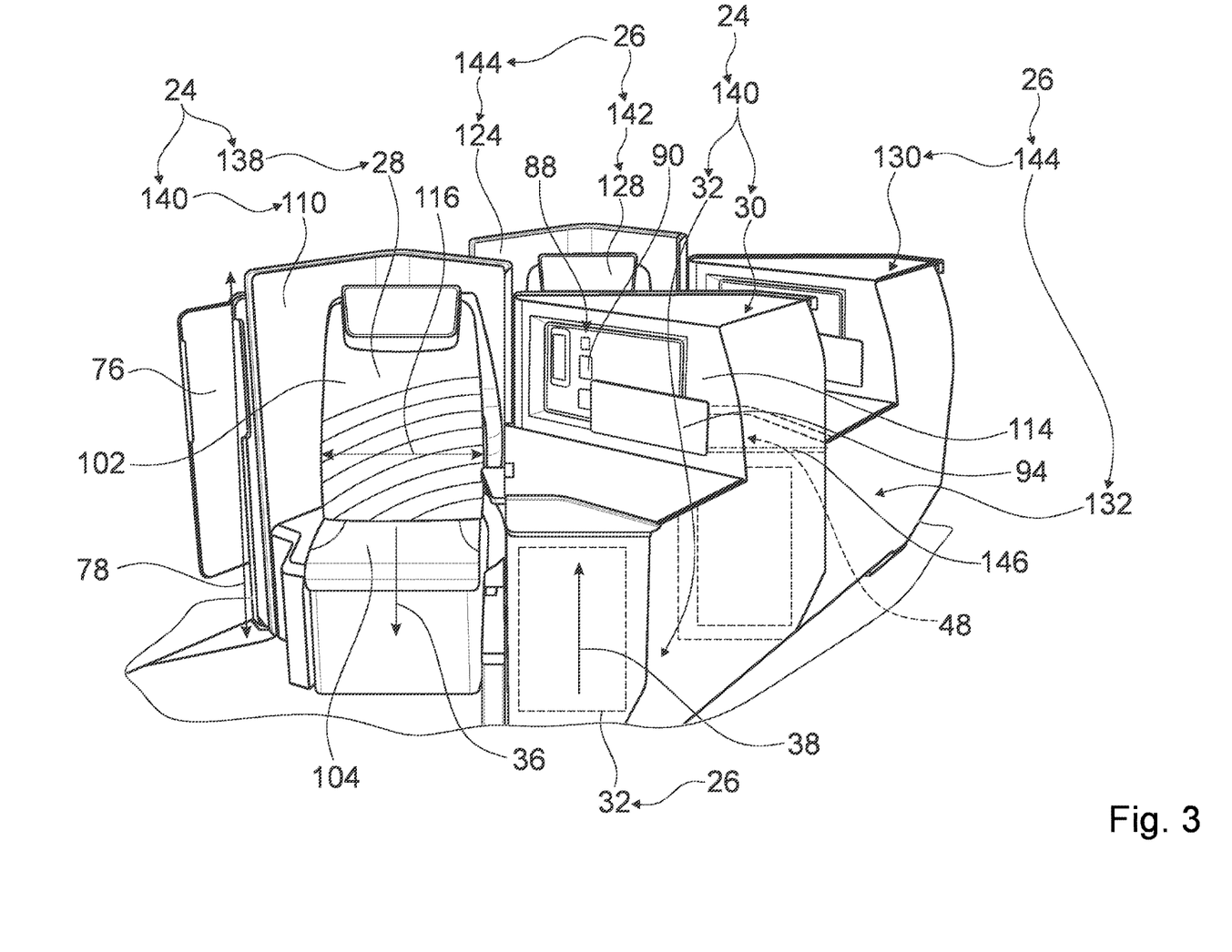

The first seat unit 24 comprises an upper shell 30, a lower shell 32 and a rear shell 110 (cf. FIGS. 1 and 3). The upper shell 30, the lower shell 32 and the rear shell 110 define a passenger area 120. The lower shell 32 of the first seat unit 24 extends from the cabin floor 74 in a vertical direction 38 (cf. FIG. 3). The vertical direction 38 is at least substantially perpendicular to the cabin floor 74. The lower shell 32 has an extension of at least 29 inches in the vertical direction 38.

Figure 2:
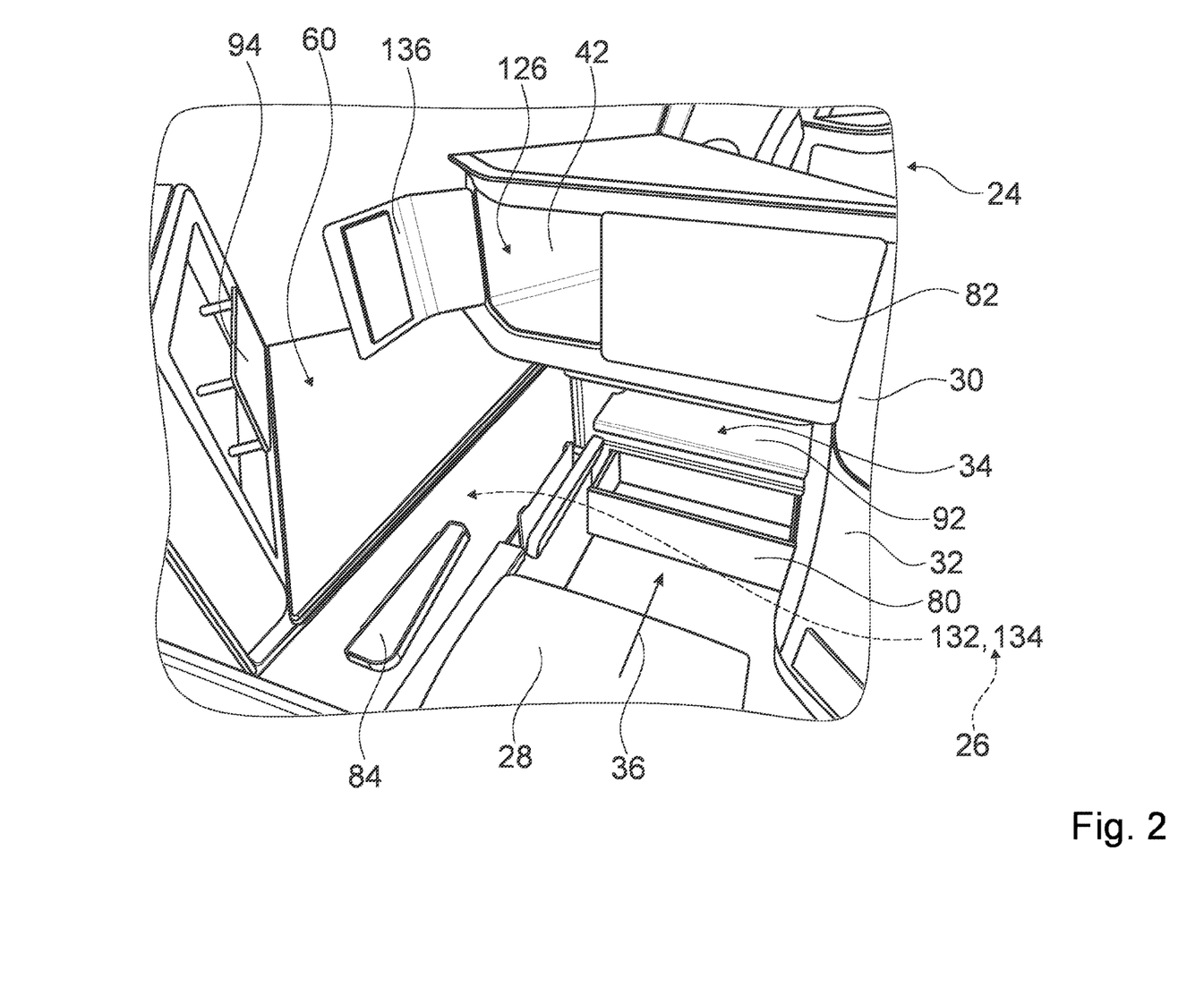

FIG. 2 shows the first seat unit 24 in a schematic perspective view. The lower shell 32 forms a bottom wall, a front wall and two side walls of a footwell 34 of the first seat unit 24. The first seat unit 24 comprises an ottoman 92, which is arranged inside the footwell 34. The ottoman 92 has a width of at least 25 inches in a direction at least substantially perpendicular to a seating direction 36. At the top of the footwell 34 the upper shell 30 is linked together with the lower shell 32. The upper shell 30 forms a top wall of the footwell 34. The upper shell 30 extends in the vertical direction 38 starting from the top end of the lower shell 32 at least substantially perpendicular to the cabin floor 76. The upper shell 30 has an extension of at least 45 inches in the vertical direction 38. The first seat unit 24 comprises a drawer 80, which is arranged below the footwell 34 of the first seat unit 24. Alternatively it would be also conceivable, that the first seat unit 24 comprises an open stowage (not shown) or stowage with a flap (not shown) instead of the drawer 80. The first seat unit 24 comprises a monitor 82. The monitor 82 may be used by a passenger for working and/or for entertainment purposes. The monitor 82 is arranged at the upper shell 30 of the first seat unit 24.

The first seat unit 24 has an extension 72 of at least 37 inches in the longitudinal direction 20. In the present case the extension 72 amounts to 40 inches. The seat unit 24 has a vertical extension 106. The vertical extension 106 extends from the aisle 18 to the exterior wall 96. The vertical extension 106 has at least 50 inches. In the present case the vertical extension 106 amounts to at least 60 inches. The first seat unit 24 has an egress 112, in order to provide access for a passenger from the aisle 18 to the first seat unit 24. The egress 112 has an extension of at least 14 inches in the vertical direction 38. In the present case the egress 112 has an extension of approximately 9 inches in the longitudinal direction 20.

As can be seen in FIG. 1 the first seat unit 24 has a seat 28. The seat 28 is arranged inside the passenger area 120. The seat 28 comprises a backrest 102 and a seat bottom 104. The seat bottom 104 is mounted to the cabin floor 74 of the aircraft cabin 12 by means of a mounting structure (not shown). The seat bottom 104 is at least substantially parallel to the cabin floor 74 of the aircraft cabin 12. The backrest 102 is movably connected to the seat bottom 104. The seat 28 has a seating configuration 52 and a flat-bed configuration 54. In the seating configuration 52 the backrest 102 is arranged at least substantially perpendicular to the cabin floor 74 of the aircraft cabin 12. In the flat-bed configuration 54 the backrest 102 is at least substantially parallel to the cabin floor 74 of the aircraft cabin 12. In the flat-bed configuration 54 of the seat 28 the first seat unit 24 provides a lying-down surface 56. The lying-down surface 56 is at least substantially planar and at least substantially parallel to the cabin floor 74. In the flat-bed configuration 54 the backrest 102 and the seat bottom 104 form the lying-down surface 56 in combination with the ottoman 92 inside the footwell 34 (cf. FIG. 1). The lying-down surface 56 has a length 58 of at least 80 inches. In the present case the length 58 of the lying-down surface 56 amounts to approximately 80 inches. The backrest 102 and the seat bottom 104 have a maximum extension 116 in a direction at least substantially perpendicular to the seating direction 36. The maximum extension 116 amounts to at least 20 inches. In the present case the maximum extension 116 amounts to approximately 20 inches. The seat unit 24 provides a shoulder space 46. The shoulder space 46 exceeds the maximum extension 116 of the backrest 102 of the seat 28 by at least 2 inches in each direction perpendicular to the seating direction 36 and parallel to the cabin floor 74 of the aircraft cabin 12. The shoulder space 46 has a width 50 of at least 28 inches. In the present case the shoulder space 46 has a width 50 of approximately 29 inches. The first seat unit 24 comprises an armrest 84. The armrest 84 is arranged at the lower shell 32 next to the seat 28. The seat 28 is arranged in the seating direction 36. The seating direction 36 is at least substantially perpendicular to the backrest 102 of the seat 28. The seat 28 is arranged such that the seating direction 36 includes a maximum seating angle 44 of 45° with the longitudinal axis 22 of the aircraft cabin 12 (cf. FIG. 1). In the present embodiment the seating angle 44 between the seating direction 36 and the longitudinal axis 22 amounts to approximately 40°. The seat 28 of the first seat unit 24 is arranged such that the seating direction 36 is facing away from the aisle 18.

The second seat unit 26 comprises an upper shell 130, a lower shell 132 and a rear shell 124. The upper shell 130, the lower shell 132 and the rear shell 124 define a passenger area 122. Some aspects of the first seat unit 24, which are exemplarily shown in FIG. 2 can be analogously transferred to the second seat unit 26. The lower shell 132 of the second seat unit 26 extends from the cabin floor 74 in the vertical direction 38. The lower shell 132 of the second seat unit 26 has an extension of at least 29 inches in the vertical direction 38. The lower shell 132 forms a bottom wall, a front wall and two side walls of a footwell 134 of the second seat unit 26. The second seat unit 26 comprises an ottoman (not shown) which is arranged inside the footwell 134. At the top of the footwell 134 the upper shell 130 is linked together with the lower shell 132 analogously to the upper shell 30 and the lower shell 32 of the first seat unit. The upper shell 130 forms a top wall of the footwell 134. The upper shell 130 extends in the vertical direction 38 starting from the top end of the lower shell 132 at least substantially perpendicular to the cabin floor 74.

The second seat unit 26 has a seat 128. The seat 128 is arranged inside the passenger area 122 of the second seat unit 26. In the present embodiment the seat 128 of the second seat unit 26 has at least substantially the same properties as the seat 28 of the first seat unit 24. Hence properties of the seat 128 of the second seat unit 26 may be derived from the above description regarding the seat 28 of the first seat unit 24. The upper shell 30 of the first seat unit 24 and the lower shell 132 of the second seat unit 26, which, viewed in the longitudinal direction 20, is arranged behind the first seat unit 24, partially overlap in the vertical direction 38 (cf. FIGS. 1 and 3). The upper shell 30 of the first seat unit 24 and the lower shell 132 of the second seat unit 26 have an overlap extension 108 in the longitudinal direction 20 (cf. FIG. 1). The overlap extension 108 is perpendicular to the vertical direction 38. The overlap extension 108 amounts to at least 5 inches.

Viewed in a transverse direction 40 (cf. FIG. 1) perpendicularly to the longitudinal axis 22 of the aircraft cabin 12 the footwell 34 of the first seat unit 24 partially overlaps with the footwell 134 of the second seat unit 26.

The first seat unit 24 comprises an upper stowage 42. The upper stowage 42 of the first seat unit 24 is partially arranged above the lower shell 132 of the second seat unit 26. The upper stowage 42 is arranged besides the monitor 82 of the first seat unit 24. The upper stowage 42 provides a storage space, e.g. for storing personal items of a passenger. The upper stowage 42 has a storing capacity of at least 1100 cubic inches. In the present embodiment the upper stowage 42 has one stowage compartment 126. Alternatively however it would be also conceivable that the upper stowage 42 comprises a plurality of separated compartments (not shown), some of which my be accessible from the second seat unit 26. In the present embodiment the upper stowage 42 comprises a flap 136 by means of which the stowage compartment 126 can be closes off. However, the upper stowage alternatively may could be implemented without the flap. Furthermore it would be conceivable that the upper stowage comprises at least shelf (not shown) which subdivides the stowage compartment 126 and which may in particular be used to store books of a passenger. The first seat unit 24 comprises a shelf space 60. The shelf space 60 is arranged above the footwell 134 of the second seat unit 26. The shelf space 60 has a maximum extension 62 of at least 30 inches in a direction that is perpendicular to the longitudinal direction 20. The shelf space 60 has an extension 64 of at least 19 inches in the longitudinal direction 20.

The first seat unit 24 and the second seat unit 26 each comprise a table 66. The table 66 has a width 68 of at least 24 inches and a depth 70 of at least 22 inches. The table 66 is embodied as a try table. In a folded-out position the table 66 ends flush with the shelf space 60 that is arranged above the lower shell 132 of the second seat unit 26. The table 66 and the shelf space 60 in combination provide an overall extension 86 of at least 50 inches.

FIG. 3 shows the first seat unit 24 and the second seat unit 26 in a schematic perspective view in a direction opposite to the seating direction 36 of the seat 28.

The first seat unit 24 comprises a first seat module 138. The first seat module 138 comprises the seat 28. The first seat unit 24 comprises a first furniture module 140. The upper shell 30, the lower shell 32 and the rear shell 110 form the first furniture module 140 of the first seat unit 24. The first seat module 138 and the first furniture module 140 of the first seat unit 24 are arranged adjacent to each other in the transverse direction 40 (cf. FIG. 1). The first seat module 138 and the first furniture module 140 in combination form the first seat unit 24. The second seat unit 26 comprises a second seat module 142. The second seat module 142 comprises the seat 128. The second seat unit 26 comprises a second furniture module 144. The upper shell 130, the lower shell 132 and a rear shell 124 of the second seat unit 26 form the second furniture module 144. The second seat module 142 and the second furniture module 144 of the second seat unit 26 are arranged adjacent to each other in the transverse direction 40 (cf. FIG. 1).

The upper shell 30 of the first seat unit 24 and the lower shell 132 of a second seat unit 26, which, viewed in the longitudinal direction 20, are arranged behind the first seat unit 24, partially overlap in a vertical direction 38. The upper shell 30 of the first seat unit 24 and the lower shell 132 of the second seat unit 26 overlap in an area 48 of at least 3 square inches. Along a section, including the area 48, where the upper shell 30 of the first seat unit 132 and the lower shell 132 of the second seat unit 26 adjoin and/or overlap a bumper element 146 is arranged. The bumper element 146 is made of an elastic material and is configured to absorb shocks, e.g. in case of turbulence during a flight. Furthermore, the bumper element 146 is configured the serve as sealing element between the upper shell 30 of the first seat unit 24 and the lower shell 132 of the second seat unit 26.

In FIG. 3 the rear shell 110 of the first seat unit 24 is shown. The rear shell 110 is arranged adjacent the upper shell 130 of the second seat unit 26. The rear shell 110 of the first seat unit 24 has a height 78. The height 78 amounts to at least 48 inches, in particular in order to provide a maximum privacy for a passenger inside the first seat unit 24. In the present case the height 78 of the rear shell 110 amounts to approximately 50 inches.

The first seat unit 24 comprises a slide-door 76, by means of which the first seat unit 24 can be partially closed off towards the aisle 18, in order to further enhance a privacy for passengers. In an open state of the slide-door 76, the slide-door 76 is completely retracted inside a recess of the rear shell 110. In a closed state of the slide-door 76, the slide-door 76 completely closes off the egress 112 in the longitudinal direction 20 (cf. FIG. 1).

The first seat unit 24 comprises a supply unit 88. The supply unit 88 is configured for a power supply, e.g. to charge a passenger's mobile devices. The supply unit 88 comprises a plurality of power plugs 90. The supply unit 88 of the first seat unit 24 is arranged at a backside 114 of the upper shell 130 of the second seat unit 26. The first seat unit 24 comprises a pocket 94 to store magazines or personal items of a passenger. The pocket 94 is backlit by means of a backlight (not shown), e.g. an LED. The pocket 94 of the first seat unit 24 is mounted to the backside 114 of the upper shell 130 of the second seat unit 26. The pocket 94 is arranged next to the supply unit 88. Due to the arrangement of the supply unit 88 and the pocket 94 at the backside 114 of the upper shell 130 an electricity supply for the supply unit 88 and the backlight of the pocket 94 may advantageously be combined with an electricity supply for components of the second seat unit 26, e.g. a monitor (not shown) of the second unit, which is arranged at the upper shell 130 of the second seat unit 26.

List of Reference Numerals 10 passenger seating arrangement
12 aircraft cabin
14 first row of seat units
16 second row of seat units
18 aisle
20 longitudinal direction
22 longitudinal axis
24 first seat unit
26 second seat unit
28 seat
30 upper shell
32 lower shell
34 footwell
36 seating direction
38 vertical direction
40 transverse direction
42 upper stowage
44 seating angle
46 shoulder space
48 area
50 width
52 seating configuration
54 flat-bed configuration
56 lying down surface
58 length
60 shelf space
62 maximum extension
64 extension
66 table
68 width
70 depth
72 extension
74 cabin floor
76 slide-door
78 height
80 drawer
82 monitor
84 armrest
86 overall extension
88 supply unit
90 power plug
92 ottoman
94 pocket
96 exterior wall
98 exterior wall
102 backrest
104 seat bottom
106 vertical extension
108 overlap extension
110 rear shell
112 egress
114 backside
116 maximum extension
120 passenger area
122 passenger area
124 rear shell
126 stowage compartment
128 seat
130 upper shell
132 lower shell
134 footwell
136 flap
138 first seat module
140 first furniture module
142 second seat module
144 second furniture module
146 bumper element

The invention claimed is:

1. A passenger seating arrangement in an aircraft cabin, the passenger seating arrangement comprising: exactly two rows of seat units and exactly one aisle, wherein a first row of seat units and a second row of seat units are separated by the aisle, and wherein the rows of seat units and the aisle all extend in a longitudinal direction parallel to a longitudinal axis of the aircraft cabin, each seat unit comprising a seat, an upper shell and a lower shell, the lower shell forming a footwell, wherein the seats are arranged in parallel to each other in a seating direction, wherein, viewed in the longitudinal direction, a second seat unit is arranged behind the first seat unit, wherein the upper shell of the first seat unit and the lower shell of the second seat unit partially overlap in a vertical direction, and wherein, viewed in a transverse direction perpendicularly to the longitudinal axis, the footwell of the first seat unit partially overlaps with the footwell of the second seat unit.

2. The passenger seating arrangement according to claim 1, wherein
the first seat unit comprises an upper stowage, the upper stowage is partially arranged above the lower shell of the second seat unit.

3. The passenger seating arrangement according to claim 1, wherein the upper shell of the first seat unit and the lower shell of the second seat unit overlap over an area of at least 19 cm² (3 square inches).

4. The passenger seating arrangement according to claim 1, wherein each seat of each seat unit is arranged such that the seating direction includes a maximum seating angle of 45° with the longitudinal axis.

5. The passenger seating arrangement according to claim 1, wherein each seat of each seat unit is arranged such that the seating direction is facing away from the aisle.

6. The passenger seating arrangement according to claim 1, wherein each seat unit provides a shoulder space having a width of at least 71 cm (28 inches).

7. The passenger seating arrangement according to claim 1,
wherein each seat has a seating configuration and a flat-bed configuration, and
wherein in the flat-bed configuration the seat unit provides a lying-down surface with a length of at least 203 cm (80 inches).

8. The passenger seating arrangement according to claim 1, wherein the first seat unit comprises a shelf space that is arranged above the footwell of the second seat unit.

9. The passenger seating arrangement according to claim 8, wherein the shelf space has a maximum extension of about 76 cm (30 inches) in a direction that is perpendicular to the longitudinal direction and an extension of at least 48 cm (19 inches) in the longitudinal direction.

10. The passenger seating arrangement according to claim 1, wherein each seat unit comprises a table having a width of at least 61 cm (24 inches) and a depth of at least 56 cm (22 inches.

11. The passenger seating arrangement according to claim 1, wherein each seat unit has an extension of at least 94 cm (37 inches) in the longitudinal direction.

12. The passenger seating arrangement according to claim 1, wherein, viewed in the transverse direction perpendicularly to the longitudinal axis, the footwell of the first seat unit partially overlaps with the footwell of the second seat unit in the longitudinal direction by at least 12 cm (5 inches).

13. The passenger seating arrangement according to claim 1, wherein each seat unit further comprises:
a rear shell, wherein the upper shell, the lower shell and the rear shell define a passenger area, and wherein the upper shell and the rear shell have a same height.

14. The passenger seating arrangement according to claim 1, wherein the rear shell of the second seat unit further comprises a door configured to open and close an egress from the passenger area of the second seat unit to the aisle, the egress being between the rear shell of the second seat unit and the rear shell of the first seat unit.

15. A passenger seating arrangement in an aircraft cabin, the passenger seating arrangement comprising:
exactly two rows of seat units and exactly one aisle, wherein a first row of seat units and a second row of seat units are separated by the aisle, and wherein the rows of seat units and the aisle all extend in a longitudinal direction parallel to a longitudinal axis of the aircraft cabin,
each seat unit comprising
a seat,
an upper shell and a lower shell, the lower shell forming a footwell,
wherein the seats are arranged in parallel to each other in a seating direction,
wherein, viewed in the longitudinal direction, a second seat unit is arranged behind a first seat unit,
wherein the upper shell of the first seat unit and the lower shell of the second seat unit-partially overlap in a vertical direction,
wherein, viewed in a transverse direction perpendicularly to the longitudinal axis, the footwell of the first seat unit partially overlaps with the footwell of the second seat unit,
wherein each seat of each seat unit is arranged such that the seating direction includes a maximum seating angle of 45° with the longitudinal axis,
wherein each seat of each seat unit is arranged such that the seating direction is facing away from the aisle,
wherein each seat has a seating configuration and a flat-bed configuration,
wherein in the flat-bed configuration the seat unit provides a lying-down surface with a length of at least 203 cm (80 inches),
wherein, viewed in the transverse direction perpendicularly to the longitudinal axis, the footwell of the first seat unit partially overlaps with the footwell of the second seat unit in the longitudinal direction by at least 12 cm (5 inches).

* * * * *